(No Model.) 2 Sheets—Sheet 1.

J. & W. LLOYD & R. O. JONES.
STEAM ELIMINATOR.

No. 600,921. Patented Mar. 22, 1898.

WITNESSES:
H. B. Mitten
Lou F. Mitten.

INVENTORS:
John Lloyd
William Lloyd
Richard O. Jones.

(No Model.) 2 Sheets—Sheet 2.

J. & W. LLOYD & R. O. JONES.
STEAM ELIMINATOR.

No. 600,921. Patented Mar. 22, 1898.

WITNESSES:
S. B. Mitten
Lou F. Mitten

INVENTORS:
John Lloyd
William Lloyd
Richard O. Jones

UNITED STATES PATENT OFFICE.

JOHN LLOYD, WILLIAM LLOYD, AND RICHARD O. JONES, OF PITTSTON, PENNSYLVANIA.

STEAM-ELIMINATOR.

SPECIFICATION forming part of Letters Patent No. 600,921, dated March 22, 1898.

Application filed June 21, 1897. Serial No. 641,738. (No model.)

*To all whom it may concern:*

Be it known that we, JOHN LLOYD, WILLIAM LLOYD, and RICHARD O. JONES, citizens of the United States, residing at Pittston, in the county of Luzerne and State of Pennsylvania, have invented a new and Improved Steam-Eliminator, of which the following description, in connection with the accompanying drawings, is a full, clear, and exact specification.

The invention relates to improvements in steam-eliminators or apparatus for the purpose of eliminating water, entrained moisture, grease, oil, or impurities from steam at any pressure and automatically discharging the water, entrained moisture, grease, oil, or impurities into the atmosphere or into any vessel provided for the same. These objects are accomplished by the mechanism illustrated in the accompanying drawings, in which—

Figure 2:
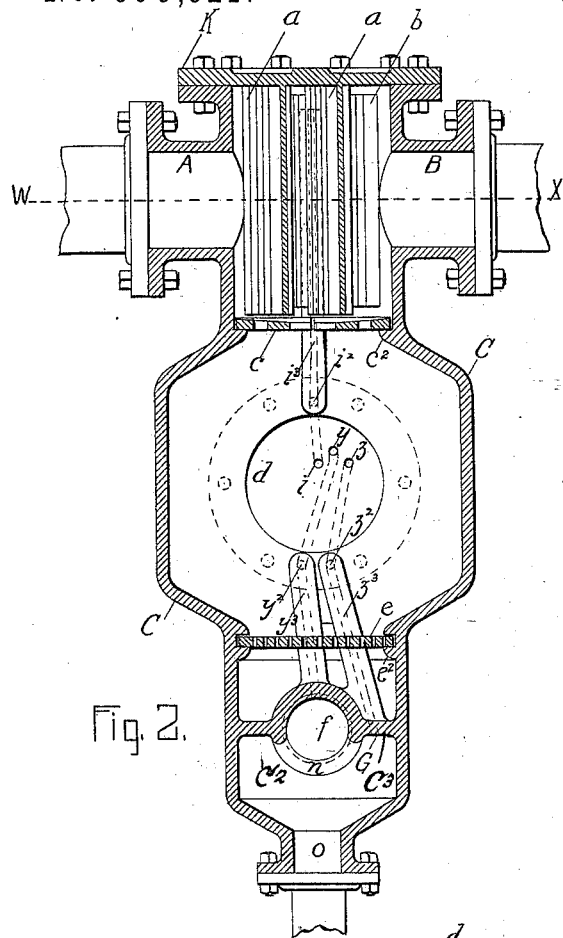
Figure 1:
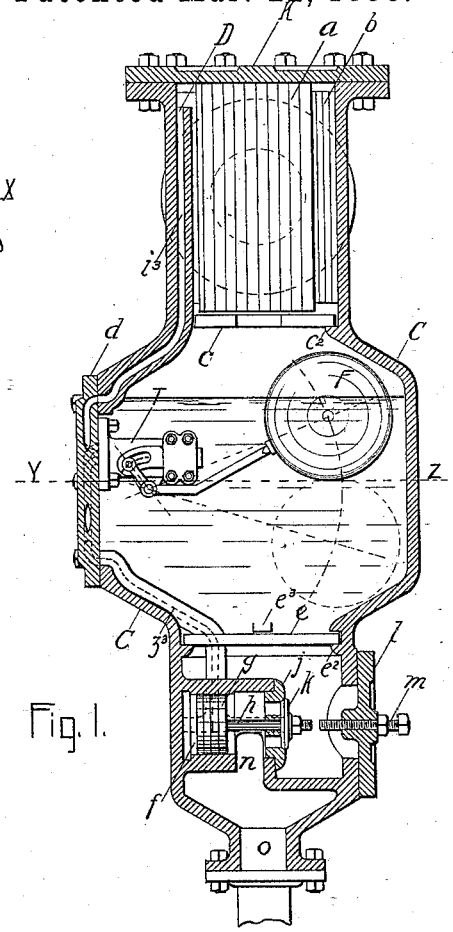
Figure 3:
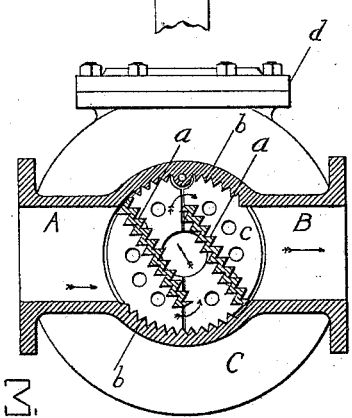
Figure 4:
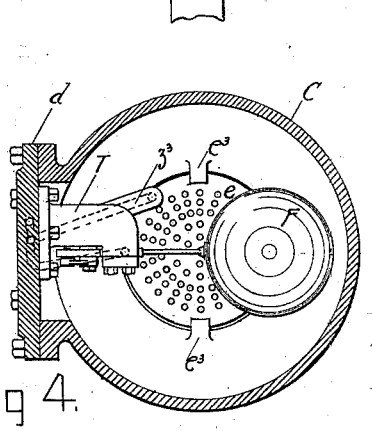
Figure 5:
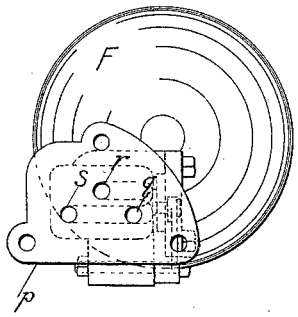
Figure 6:
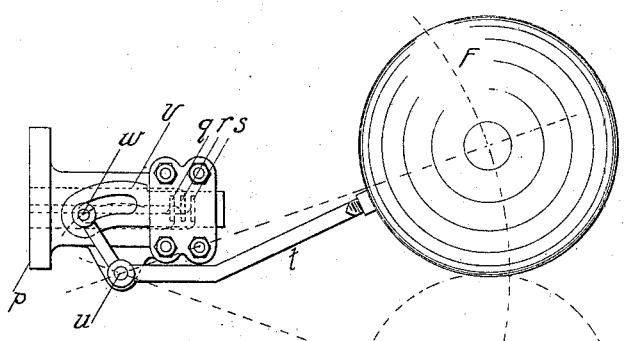
Figure 8:
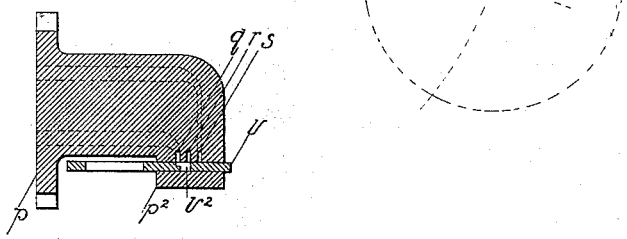
Figure 7:
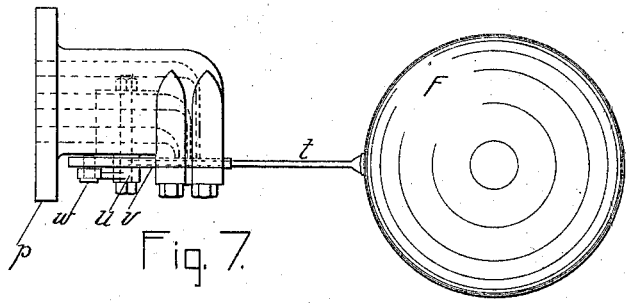

Figure 1 is a vertical section of the entire machine; Fig. 2, another vertical section at right angles to the section shown in Fig. 1, but having the throttle and float removed to show more clearly the arrangement of the steam-ports. Fig. 3 is a horizontal section on line W X, Fig. 2. Fig. 4 is a horizontal section on line Y Z, Fig. 1. Fig. 5 is a detail end view of the throttle and float mechanism. Fig. 6 is a side elevation of the same. Fig. 7 is a plan view of the same. Fig. 8 is a horizontal section of throttle, showing arrangement of ports.

Similar letters refer to similar parts throughout the several views.

In the improved steam-eliminator, C is a casing or reservoir designed to collect the water, entrained moisture, grease, oil, or impurities or whatever may be eliminated from the steam and to hold same until liberated by the outlet-valve. The casing C is provided with the steam inlet and outlet openings (shown at A and B) and the outlet-opening for discharge, (shown at $o$,) also the corrugated surfaces of sharp points $b$, also the annular rings or shoulders $c^2$ and $e^2$ and the brackets $e^3$, also the steam-pipes $i^3$, $y^3$, and $z^3$, also the steam-cylinder $f$, also the partition-webs $C^2$ and $C^3$, designed to close the lower portion of the outlet-chamber from the rest of the casing.

K is a cap or cover secured to the casing C, but removable at will. To this cover are secured the baffle-plates $a$, which have corrugated surfaces of sharp edges designed to eliminate the water, entrained moisture, grease, oil, or impurities from the steam. Underneath these baffle-plates $a$ is a perforated plate $c$, made in halves and resting upon the annular ring $c^2$, designed to prevent the steam from siphoning or picking up the water after it has been deposited in the reservoir.

The hand-hole cover $d$, secured to the casing C, but removable at will, facilitates free access to the working parts of the machine for repair or adjustment. The cover $d$ contains the steam-ports $i$, $y$, and $z$, leading into and connecting with the steam-ports $i^2$, $y^2$, and $z^2$ in the casing C. The perforated plate $e$, made in halves and resting upon the annular ring or shoulder $e^2$, is held in place by the brackets $e^3$. This perforated plate $e$ is designed to break the water into small portions as it goes out, scattering it over a larger area than that of the outlet-valve, thereby preventing the steam from blowing through the body of water and escaping. To the steam-cylinder $f$ is fitted the piston $g$, to which is secured the rod $h$, to which rod is secured the outlet-valve $k$.

To the cover $d$ is secured the throttle T, Figs. 5, 6, 7, and 8. The pressure-plate $p^2$ is secured to the throttle-seat $p$ and is designed to relieve the slide-valve $v$ from friction due to steam-pressure. The throttle-seat $p$ contains the steam-ports $q$, $r$, and $s$, which lead from the cover $d$ to the slide-valve $v$, in which is the steam-port $v^2$. A movement to the left of the slide-valve $v$ thus opens to each other the ports $q$ and $r$, while a movement to the right of the slide-valve $v$ opens to each other the ports $r$ and $s$, closing to each other the ports $q$ and $r$. The slide-valve $v$ is operated by the float F through the rod $t$ and the pin $w$, the rod $t$ being fulcrumed on the pin $u$, secured to the throttle-seat $p$. The float F, resting upon the surface of the water in the casing C, rises and falls with the surface of the water, thus operating and controlling the movement of the slide-valve $v$.

The operation of the mechanism in the improved steam-eliminator is described as follows: The steam, entering the casing C at A, takes the direction shown by the arrows, Fig. 3, passing over the baffle-plates $a$ and the points $b$, and passes out of the casing at B. In its passage over these sharp points the steam is relieved of loose water, entrained moisture, grease, oil, or impurities, all of which fall through the perforated plate $c$ into the reservoir beneath. The outlet-valve $k$ being closed by the steam-pressure in the casing, the water rises to the level of the upper position of the float F, as shown in Fig. 1. The power then exerted by the float, due to its displacement, moves the valve $v$ to the left, opening the port $q$ to the port $r$, allowing steam to pass into the pipe $i^3$ at D, thence through the cover $d$, the throttle, and the pipe $y^3$ into the cylinder $f$. The pressure of the steam in the cylinder $f$ forces the piston $g$ forward, and with it the outlet-valve $k$, when the steam-pressure in the casing forces the confined water through the valve-seat $j$ and the opening $n$ and thence out of the machine at $o$. When the surface of the water has dropped to the level of the lower position of the float, (shown by dotted lines, Fig. 1,) the float moves the slide-valve $v$ to the right, closing the port $q$ to the port $r$ and opening the port $r$ to the port $s$, making a free open exhaust through the pipe $y^3$, the cover $d$, the throttle, and the pipe $z^3$ out of the machine at G. The piston $g$ being then relieved of the steam-pressure behind it, the outlet-valve $k$ is again closed by the steam-pressure in the casing, when the water rises again, thus repeating the operation.

It will thus be seen that the mechanism is entirely automatic, discharging at intervals whatever may be eliminated from the steam.

Having thus described our invention, what we claim as new, and desire to secure by Letters Patent, is—

1. In a steam-eliminator having a casing or reservoir provided with steam-inlet and steam-outlet openings and discharge-outlet opening, the combination, of a set of baffle-plates secured to a removable cover, said baffle-plates having surfaces corrugated with sharp edges, with a set of corrugated surfaces with sharp edges secured to said casing, substantially as shown.

2. In a steam-eliminator having a casing or reservoir provided with steam-inlet and steam-outlet openings and discharge-outlet opening, and also provided with an annular ring, the combination, of a set of baffle-plates secured to a removable cover, said baffle-plates having surfaces of corrugated sharp edges, with a perforated set underneath said baffle-plates and resting on said annular ring, substantially as shown.

3. In a steam-eliminator having a casing provided with steam-inlet and steam-outlet openings and discharge-outlet opening and also provided with steam-pipes as shown, the combination of (1) a removable hand-hole cover provided with steam-ports, said ports leading to and opening into said steam-pipes in said casing, with (2) a steam-throttle provided with a slide-valve, said slide-valve controlled and operated by a float, said float attached to a lever, said float resting upon the surface of water in said casing, with (3) a steam-cylinder, a piston held to travel in said cylinder, a rod secured to said piston, an outlet-valve seated in a valve-seat and secured to said rod, a valve-seat secured to said casing, substantially as shown.

4. In a steam-eliminator having a casing provided with steam-inlet and steam-outlet openings and discharge-outlet opening, and also provided with steam-pipes as shown, the combination (1) of a steam-throttle provided with a slide-valve, said slide-valve controlled and operated by a float, said float attached to a lever, said float resting upon the surface of the water in said casing, with (2) a steam-cylinder, a piston held to travel in said cylinder, a rod secured to said piston, an outlet-valve seated in a valve-seat and secured to said rod, a valve-seat secured to said casing, with (3) a removable hand-hole cover provided with a set-screw, said set-screw arranged to limit the movement, by adjustment, of the outlet-valve, substantially as shown.

5. In a steam-eliminator, having a casing provided with steam-inlet and steam-outlet openings and discharge-outlet opening and also provided with two annular rings and four brackets, the combination of (1) one perforated plate resting upon an annular ring, with (2) another perforated plate resting upon another annular ring and held in place by said brackets, with (3) a removable hand-hole cover provided with steam-ports as shown, said ports leading to and opening into steam-pipes in said casing, with (4) a steam-throttle provided with a slide-valve, said slide-valve controlled and operated by a float, said float resting upon the surface of the water in said casing, with (5) a steam-cylinder, a piston held to travel in said cylinder, a rod secured to said piston, an outlet-valve seated in a valve-seat and secured to said rod, a valve-seat secured to said casing, substantially as shown.

6. In a steam-eliminator having a casing provided with steam-inlet and steam-outlet openings and discharge-outlet opening, and also provided with a set of corrugated surfaces of sharp edges, also provided with two annular rings and four brackets, also provided with a steam-cylinder, also provided with steam-pipes as shown, also provided with partition-webs to close one part of said casing from another part of said casing, the combination of (1) a set of baffle-plates having corrugated surfaces of sharp edges, said baffle-plates secured to a removable cover, with (2) a perforated plate set underneath said baffle-plates and resting on said annular ring, with (3) another perforated plate resting on another annular ring and held in place by said brackets, with (4) a removable hand-hole cover provided with steam-ports, said ports leading to and opening into said steam-pipes in said casing, with (5) a steam-throttle provided with a slide-valve, said slide-valve protected by a pressure-plate, said slide-valve controlled and operated by a float, said float resting on the surface of the water in said casing, with (6) a piston held to travel in said cylinder, a rod secured to said piston, an outlet-valve seated in a valve-seat and secured to said rod, a valve-seat secured to said casing, with (7) a hand-hole cover provided with a set-screw, said set-screw arranged to limit the movement, by adjustment, of said outlet-valve, substantially as shown.

JOHN LLOYD.
WILLIAM LLOYD.
RICHARD O. JONES.

Witnesses:
T. B. MITTEN,
LOU F. MITTEN.